United States Patent
Nachbauer

[11] Patent Number: 5,927,111
[45] Date of Patent: Jul. 27, 1999

[54] LOCKABLE OUTDOOR WATER FAUCET ARTICLE

[76] Inventor: Armand E. Nachbauer, 811 Bolivar St., Lady Lake, Fla. 32159

[21] Appl. No.: 08/954,388

[22] Filed: Oct. 20, 1997

[51] Int. Cl.[6] .................................................. F16K 35/06
[52] U.S. Cl. ............................. 70/161; 70/168; 70/178; 70/179; 70/211; 137/382; 248/553
[58] Field of Search .............................. 70/158–173, 202, 70/203, 211, 212, DIG. 58, 232; 137/377, 382; 248/551, 552, 553

[56] References Cited

U.S. PATENT DOCUMENTS

| | | | |
|---|---|---|---|
| 280,912 | 7/1883 | Connolly | 70/232 |
| 1,084,996 | 1/1914 | Wright | 70/178 |
| 2,686,530 | 8/1954 | Dire | 137/382 X |
| 2,838,064 | 6/1958 | Schieberl | 137/382 |
| 2,990,846 | 7/1961 | Rives | 137/377 |
| 4,301,828 | 11/1981 | Martin, Jr. | 137/382 X |
| 4,352,370 | 10/1982 | Childress | 137/382 |
| 4,380,245 | 4/1983 | Hefner . | |
| 4,516,414 | 5/1985 | Woolvin . | |
| 4,577,655 | 3/1986 | Carroll | 137/382 X |
| 4,681,134 | 7/1987 | Paris, Sr. | 70/177 X |
| 5,033,280 | 7/1991 | Johnson | 70/178 X |
| 5,193,574 | 3/1993 | Lopez | 137/377 X |
| 5,201,202 | 4/1993 | Kam | 70/232 X |
| 5,410,896 | 5/1995 | Gleason | 70/232 X |

FOREIGN PATENT DOCUMENTS

| | | | |
|---|---|---|---|
| 1030933 | 6/1953 | France | 137/382 |
| 610036 | 3/1935 | Germany | 137/382 |
| 230529 | 3/1925 | United Kingdom | 137/377 |

*Primary Examiner*—Lloyd A. Gall
*Attorney, Agent, or Firm*—Charles R. Wilson

[57] ABSTRACT

An outdoor water faucet article is configured to secure a building water faucet from unauthorized use. The article is lockable, yet is readily unlocked to access the water faucet. The article comprises a first housing half, a complementary second housing half and locking mechanism. The first and second housing halves are hingeably connected. Together they form an enclosure for the water faucet and can be secured together by the locking mechanism to prevent access to the water faucet. Upon unlocking, the second housing half is rotated away from the first housing half to allow full access to the water faucet so that its handle can be turned and a garden hose attached to its terminus. A wall mounting mechanism is optionally used to attach at least one housing half to a wall of the building where used. Insulation can be used to line the interior walls of the housing halves to add a freeze protection feature to the article.

18 Claims, 5 Drawing Sheets

LOCKABLE OUTDOOR WATER FAUCET ARTICLE

This invention relates to a security article for use with a water faucet. More particularly, the invention relates to a lockable outdoor water faucet article with optional insulation for freeze protection purposes.

BACKGROUND OF THE INVENTION

Water in most parts of the country is plentiful and inexpensive. There are parts of the country, though, where fresh water is in short supply simply because there are insufficient sources or because high ambient temperatures necessitate high water usage. In these areas, water necessarily must be conserved. A high water usage rate is one way to force the average household to conserve water.

The cost of water can be sufficiently high to motivate someone to steal it. For instance, a neighbor or unwanted individual can normally very easily tap into a homeowner's water source through an outside water faucet. When the homeowner is away, it is a simple matter to hook up a garden hose to the unsuspecting homeowner's outdoor faucet and turn it on. Water diverted to the neighbor's yard for grass watering and other purposes can be expensive. It also can be difficult to detect since any indication there has been a wrongdoing only comes with a water bill. This can be long after the fact.

The problem of unauthorized water appropriation is a recognized problem in the drier and hotter climates. Simply turning off the water supply to the outdoor water faucet from inside the house is an obvious solution to the problem. It is also a very bothersome chore which may have to be repeated several times a day, e.g. each time the homeowner leaves the house. U.S. Pat. No. 4,516,414 describes a security locking device for an outdoor water faucet. However, there are a number of components which tend to make it expensive to produce and cumbersome to use.

There is a localized need for an outdoor water faucet article which it capable of limiting unauthorized access to the faucet. In accord with this need, there has been developed an article which has minimal components, yet is reliable.

SUMMARY OF THE INVENTION

A lockable outdoor water faucet article comprises two housing halves hingeably connected and a locking means. A first housing half at least partially encompasses the water faucet. A complementary second housing half is hingeably connected to the first housing half. The water faucet is fully encompassed when the housing halves are closed together, yet the faucet is exposed sufficiently to attach a garden hose to a terminus and turn a handle when one housing half is swung open.

DETAILED DESCRIPTION OF THE INVENTION

Figure 1:
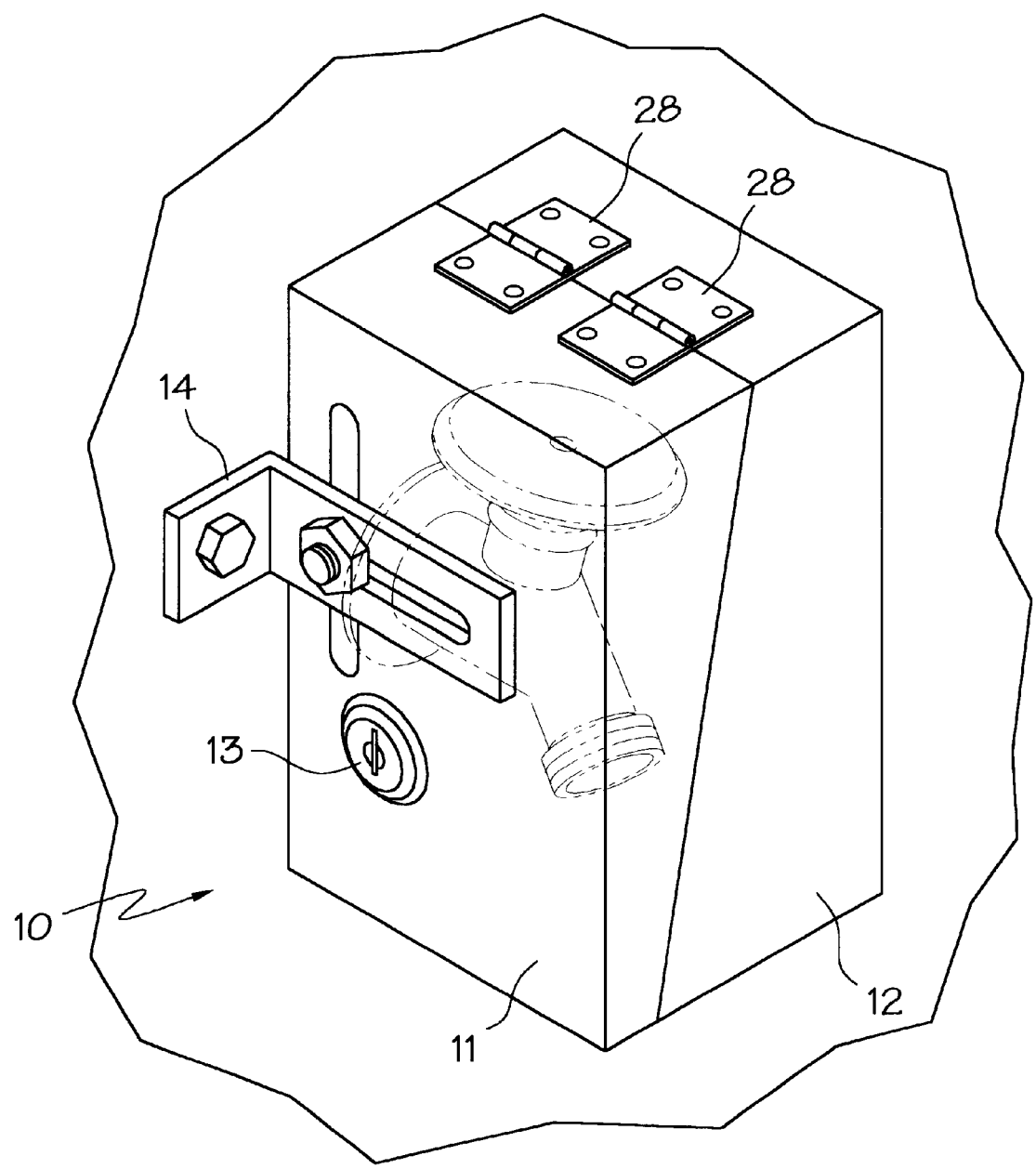
FIG. 1 is a perspective view of the lockable outdoor water faucet article of the invention when in a closed and locked mode.

The water faucet article of the invention is described with reference to the drawings. The article is particularly useful on outdoor water faucets most often found mounted on outside walls of residences and is, for this reason, described with reference to such usage. It can as well be used on faucets of commercial buildings, both indoors and outdoors.

With reference to FIGS. 1–5, there is shown a lockable outdoor water faucet article 10 of the invention. A faucet extending from a building wall is shown in phantom. The article 10 comprises a first housing half 11, a complementary second housing half 12 and a locking means 13 as its essential components. Optionally, though highly preferred, a mounting means 14 is provided to secure the article to the building wall to prevent wobble or instability of the article during use.

Figure 2:
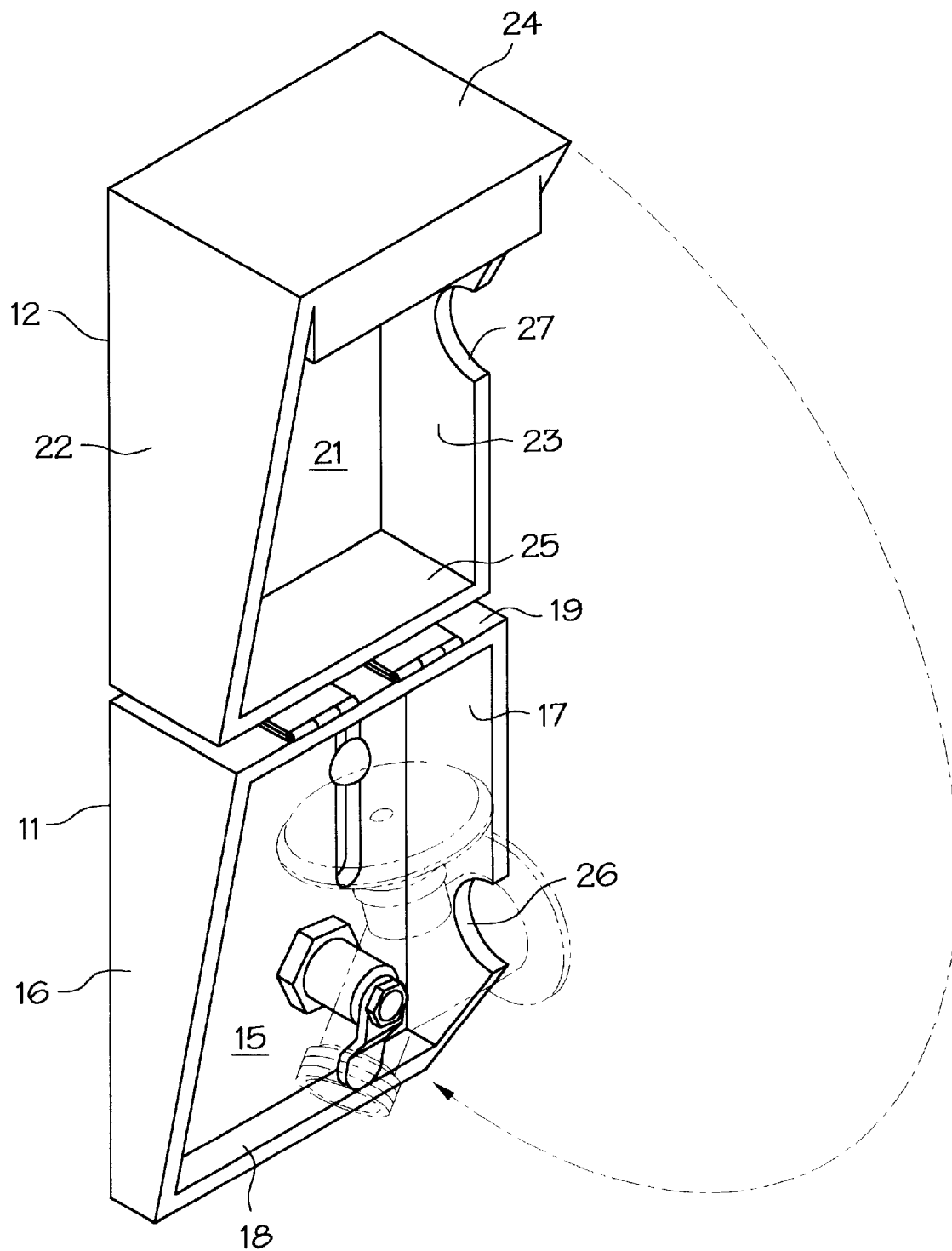
FIG. 2 is perspective view of the lockable outdoor water faucet article of FIG. 1 when one housing half is swung open to expose the faucet.

As best seen in FIGS. 1 and 2, the lockable outdoor water faucet article 10 has complementary housing halves 11 and 12. As used herein the term housing half does not necessarily imply exactly equal one-halves of a structure, but rather is used to connote two structures which are approximately equal in size and together make a whole.

The first and second housing halves 11 and 12, respectively are five-sided open box-like structures. They are complementary in that when mated together an enclosure is formed. With reference to FIG. 2, the first housing half 11 has a flat base wall 15, front side wall 16, back side wall 17, bottom side wall 18 and top side wall 19. The side walls all extend at approximate right angles to the flat base wall 15. The bottom wall 18 is more narrow than the top wall 19 such that the front and back side walls 16 and 17 each have an outer edge which slopes downwardly and inwardly. As best seen in FIG. 2, the narrow bottom side wall 18 as found on the stationary first housing half ensures that the outlet nozzle of the water faucet is fully exposed when the second housing half 12 is swung up and away from the first housing half 11. As such, water can be drawn without interference from the article or a water hose can be readily hooked-up to the water faucet.

The second housing half 12 has a flat base wall 21. Additionally, it has a front side wall 22, back side wall 23, bottom side wall 24 and top side wall 25, all extending at approximate right angles to the flat base wall 21. The top side wall 25 is more narrow than the bottom side wall 24. As evident from FIG. 4, the bottom side walls 18 and 24 together are about equal in size to the top side walls 19 and 25 together of the first and second housing halves 11 and 12.

Figure 3:
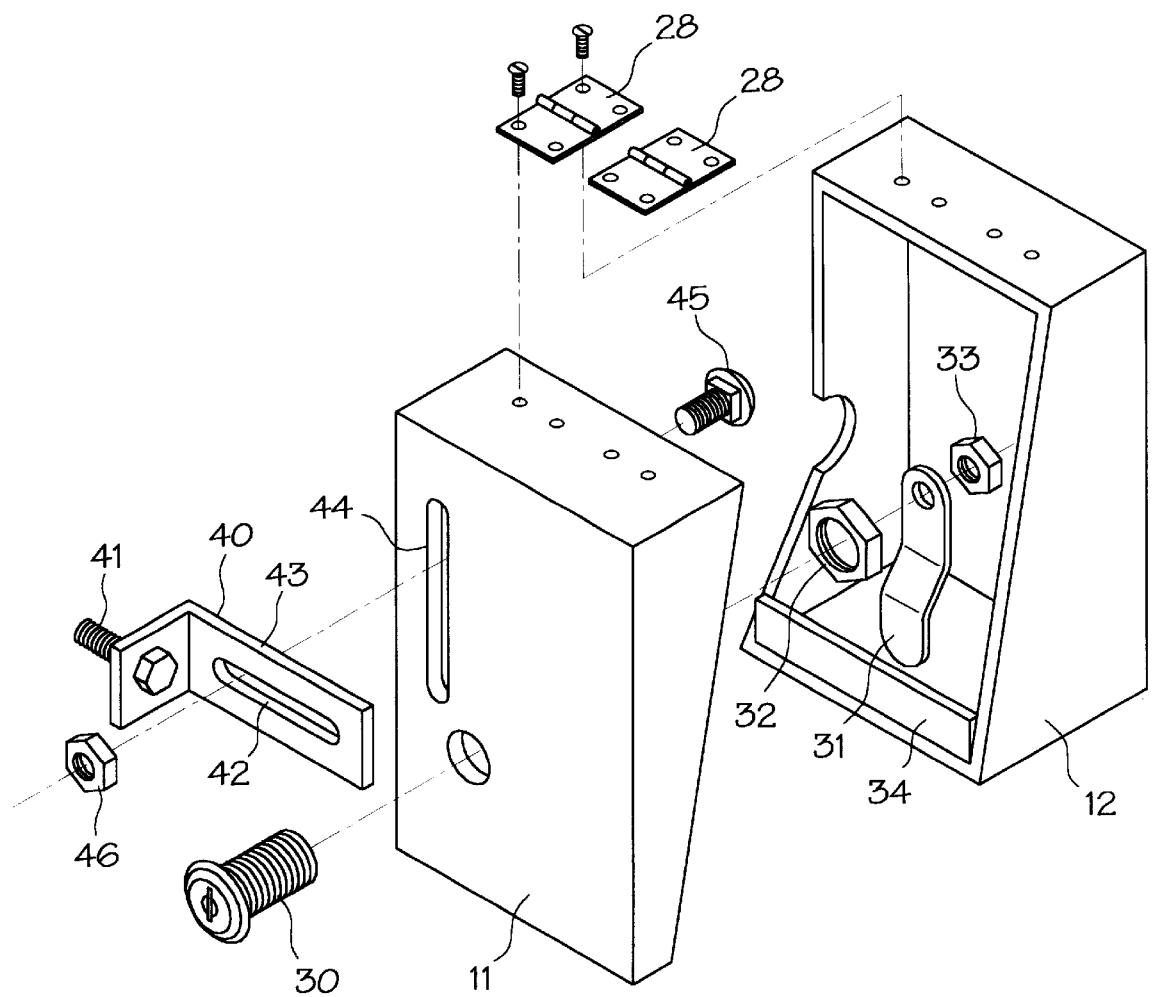
FIG. 3 is an exploded view of the lockable outdoor water faucet article of FIG. 1.
Figure 4:
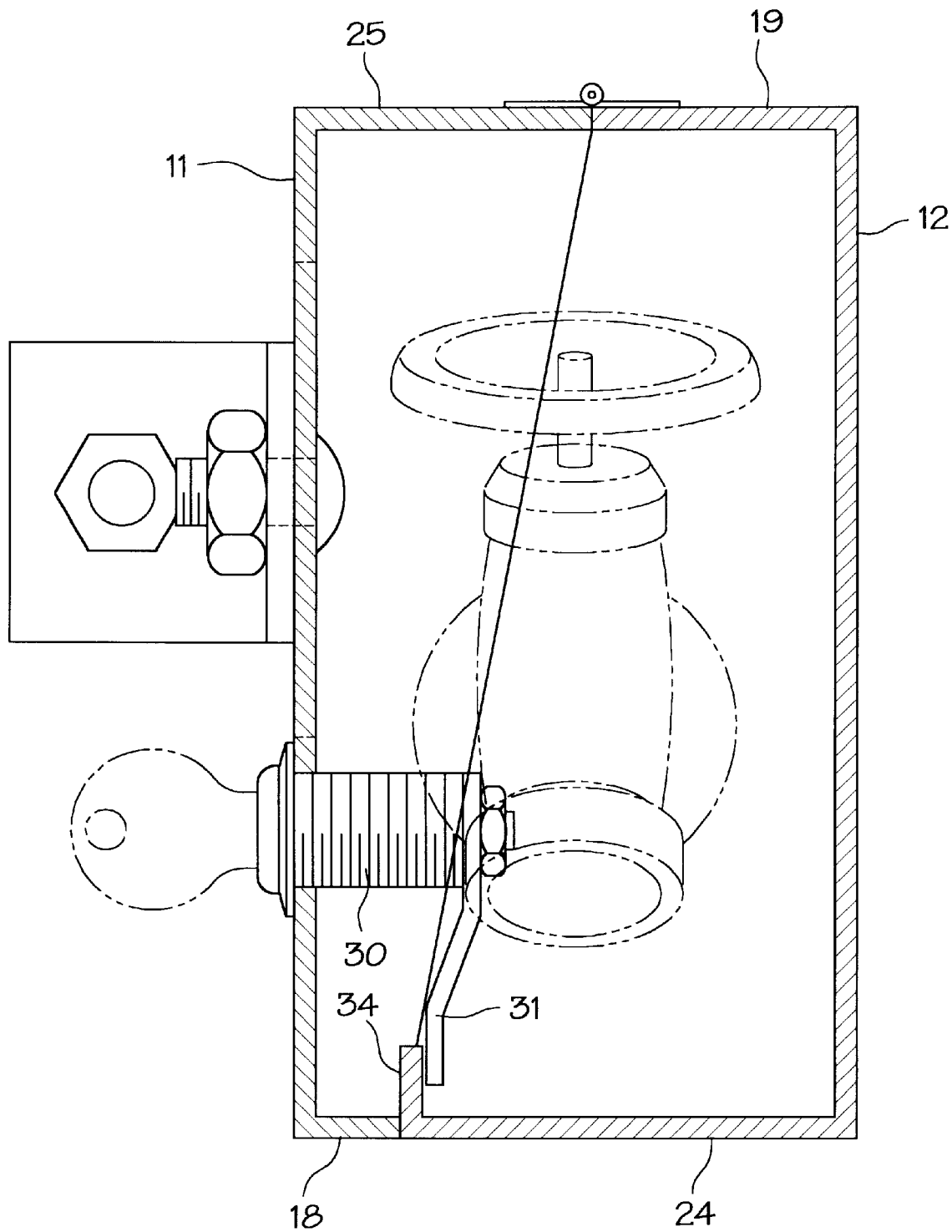
FIG. 4 is a front elevational view partially in section of the lockable outdoor water faucet of FIG. 1 showing operation of a latch means.

As best seen in FIGS. 2 and 3, the housing halves are configured to accommodate entry of a water faucet into the hollow enclosure formed by the housing halves. The back side walls 17 and 23 of each housing half has a notch along an edge. The notch 26 in the first housing half 11 and the notch 27 in the second housing half are adjacent when the article is closed. Together, they are about one inch to about two inches in diameter to accommodate a neck of the water faucet. Where freezing is a problem, the notches can have a pliable edge lining to create a substantially air tight fitting with the water faucet neck. The housing halves are also adapted to accommodate a latch means. Structural modifications are further provided to accommodate hinges and building wall mounting means as fully described below.

The two housing halves 11 and 12 are hingeably connected. Several types of hinges can be used for the connection. As depicted, a pair of leaf hinges 28 is used. Each hinge has one hinge plate attached to the first housing half 11 by screws and a second hinge plate attached to the second housing half 12 by screws. The two hinge plates move at least about 90 degrees about a hinge pin holding the two plates together. Preferably, the hinges allow the second housing half to swing at least about 180 degrees from a fully closed position shown in FIG. 1 to a fully open position shown in FIG. 2.

Other hinge means can be used in the invention, including a single piano hinge. A living hinge connection is also feasible. For example, the housing halves 11 and 12 can be molded of plastic and integrally joined by a thin flexible strip to allow the necessary rotating motion.

Locking means 13 are used to secure together the two housing halves 11 and 12 to prevent unauthorized use of water from the water faucet. Several locking means can be used. As seen best in FIGS. 1–4, a cam lock mounted on the first housing half 11 and a ledge vertically extending from the bottom wall of the second housing half 12 interact to hold the two halves together. The cam lock includes a cylindrical-shaped main lock body 30 and a revolvable latch arm 31. The main lock body 30 extends through a hole in the flat base wall 15 of the first housing half 11. The main lock body has a threaded exterior. Nuts 32 and 33 are threaded onto the main lock body 30 with optional lock washers to trap the latch arm 31. The latch arm 31 has a bent leg to interact with the ledge 34 of the second housing half 12. Such locking means are commercially available and widely used.

Other locking means can be used. For example, each housing half can have a holed ear structure extending from it. The two ears are adjacent one another. A locking inverted U-shaped arm of a padlock is simply threaded through the holes and snapped into a main body of the padlock to hold the two housing halves together.

An optional, though highly preferred, wall mounting means 14 is found on the lockable outdoor water faucet article 10. The mounting means is used to secure one housing half to a wall of the building near the water faucet. The mounting means stabilizes the article. It prevents wobble during use. Several wall mounting means can be used. It is further preferred that any mounting means be capable of horizontal and vertical adjusting movement to facilitate the wall attaching process. As shown in FIGS. 1–3, a L-shaped bracket 40 is used with a wall attachment bolt 41. A horizontal slot 42 in one leg 43 of the bracket 40 permits limited horizontal adjusting movement while a vertical slot 44 in the flat base wall of the first housing half permits limited vertical adjusting movement. A bolt 45 and nut 46 are used to hold the first housing half 11 to the bracket 40.

Figure 5:
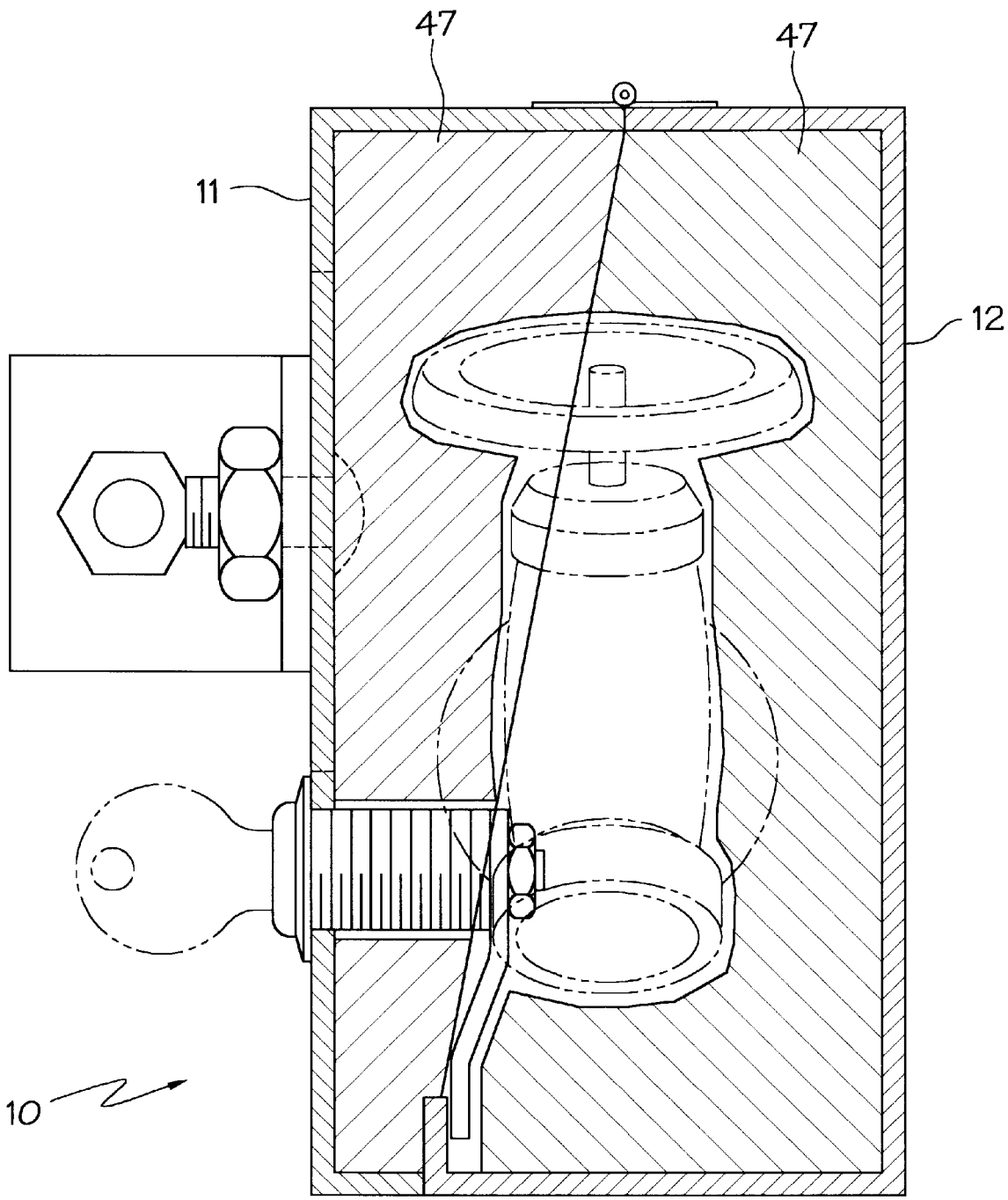
FIG. 5 is a front elevational view partially in section of the lockable outdoor water faucet article of FIG. 4 lined with insulation for freeze protection purposes.

FIG. 5 shows another optional feature of the lockable outdoor water faucet of the invention. The article 10 is the same as described above with reference to FIGS. 1–4. However, insulation 47 is used to line all the walls of the housing halves 11 and 12. This adds freeze protection to the article. The insulating material is shaped or sculpted to accommodate the water faucet. Any conventional material with insulation properties can be used. Styrofoam is particularly preferred because of its availability and ability to be shaped to virtually any configuration desired.

In use, the article of the invention is initially positioned over a water faucet simply by opening the housing halves of the article and positioning the first housing half so that the notch in the back wall fits over the neck portion of the faucet. If the article is to permanently mounted to the building wall, a hole is made in the wall and the mounting bracket secured to the wall by tightening the wall bolt. The first housing is horizontally and vertically adjusted to the mounting means and, finally, the housing's bolt and nut tightened. The water faucet can now be used. When not in use, the second housing half is rotated down about its hinge and the locking means locked. The homeowner is now assured that his or her water will not be stolen.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

I claim:

1. A lockable outdoor water faucet security article to prevent the unauthorized use of water from the faucet of a building, comprising:

(a) a first housing half to at least partially encompass the water faucet, said first housing half being generally open box-shaped with a narrow bottom side wall;

(b) a complementary second housing half hingeably connected to the first housing half, said complementary second housing half being generally open box-shaped with a bottom side wall wider than the bottom side wall of the first housing half such that the first and second housing halves form a rectangular-shaped box when said first and second housing halves are mated together to fully encompass the water faucet and allow sufficient operating access to the water faucet when said second housing half is moved away from said first housing half to expose said water faucet; and (c) a locking means to secure the first and second housing halves together to prevent access to the water faucet for turning said faucet on to draw water therefrom.

2. The lockable outdoor faucet article of claim 1 wherein the first and second housing halves are hingeably connected by at least one leaf hinge to allow one of said housing halves to pivot at least about 180 degrees to access the water faucet.

3. The lockable outdoor faucet article of claim 1 wherein the housing halves are hingeably connected by two leaf hinges.

4. The lockable outdoor faucet article of claim 1 further having a wall mounting means on at least one housing half for anchoring the article to a wall of the building.

5. The lockable outdoor water faucet article of claim 4 wherein the first housing half has an L-shaped bracket for attachment to the wall.

6. The lockable outdoor water faucet article of claim 5 wherein the L-shaped bracket is adjustably secured to the first housing half to provide substantially vertical and horizontal adjusting movement of the first housing half when mounting the article on the wall.

7. The lockable outdoor water faucet article of claim 1 wherein the first housing half has a lock with a rotatable latch arm mounted thereon and the second housing half has a substantially vertically extending ledge on a bottom side wall to trap the rotatable latch arm so as to lock the first and second housing halves together.

8. The lockable outdoor faucet article of claim 1 wherein the locking means is a cam lock.

9. The lockable outdoor faucet article of claim 1 wherein each housing half has a notch on a back wall thereof to accommodate entry of the water faucet into the article.

10. The lockable outdoor water faucet article of claim 1 further wherein the walls of each housing half are lined with an insulating material to prevent freezing of water within the water faucet.

11. The lockable outdoor faucet article of claim 10 wherein the insulating material is styrofoam.

12. A lockable outdoor water faucet security article for preventing the unauthorized use of water from the faucet of a building while allowing ready authorized access to a handle of the faucet to activate the faucet and to access an outlet nozzle of the faucet to attach a hose thereto, comprising:

(a) a first housing half to at least partially encompass the water faucet;

(b) a complementary second housing half hingeably connected to the first housing half such that the first and second housing halves fully encompass the water faucet when closed and allow sufficient access to the water faucet when opened to attach a hose thereto and to activate the water faucet, said second housing half capable of rotating at least about 180 degrees about the first housing half;

(c) a locking means to secure the first and second housing halves together to prevent access to the water faucet for turning said faucet on to draw water therefrom; and (d) a wall mounting means attached to the first housing half for mounting said first housing half of the article to a wall of the building whereby the second housing half is free to rotate the at least about 180 degrees about said first housing half to provide the access to the water faucet.

13. The lockable outdoor water faucet article of claim 12 wherein the first housing half is generally box-shaped with a front side wall and a back side wall angled downwardly and the complementary second housing half is generally box-shaped with a front side wall and a back side wall angled upwardly such that the article when opened provides free space at a bottom of the first housing half to accommodate a water hose.

14. The lockable outdoor water faucet article of claim 13 wherein the first housing half has a lock with a rotatable latch arm mounted thereon and the second housing half has a substantially vertically extending ledge on a lower edge of a bottom side wall to engage the rotatable latch arm so as to lock the first and second housing halves together.

15. The lockable outdoor faucet article of claim 12 wherein each housing half has a notch on a back side wall thereof to accommodate entry of the water faucet into the enclosure formed by the housing halves.

16. The lockable outdoor water faucet article of claim 12 further wherein the walls of each housing half are lined with an insulating material to prevent freezing of water within the water faucet.

17. A lockable outdoor water faucet security article to prevent the unauthorized use of water from the faucet of a building, comprising:

(a) a first housing half to at least partially encompass the water faucet, said first housing half being a five-sided open box-like structure with a flat base wall, a front side wall, a back side wall, a bottom side wall and a top side wall, with said front side wall and back side wall angled downwardly and inwardly towards the flat base wall so that the bottom side wall is more narrow than the top side wall;

(b) a complementary second housing half hingeably connected to the first housing half, said complementary second housing half being a five-sided open box-like structure with a flat base wall, a front side wall, a back side wall, a bottom side wall and a top side wall with the front side wall and back side wall angled upwardly so that the top side wall is more narrow than the bottom side wall such that the first and second housing halves mate to fully encompass the water faucet when they are closed and said second housing half is capable of rotating at least about 180 degrees about the first housing half when opened to allow sufficient access to an outlet nozzle of the water faucet to attach a hose thereto and to activate the water faucet;

(c) a locking means to secure the first and second housing halves together to prevent access to the water faucet for turning said faucet on to draw water therefrom; and (d) a wall mounting means attached to the first housing half for mounting the article to a wall of the building whereby said first housing half is stationary and the second housing half is free to move about said first housing half to expose the water faucet.

18. The lockable outdoor water faucet article of claim 17 wherein the first housing half has a lock with a rotatable latch arm mounted thereon and the second housing half has a substantially vertically extending ledge on a lower edge of a bottom side wall to engage the rotatable latch arm so as to lock the first and second housing halves together.

* * * * *